(12) United States Patent
Ni et al.

(10) Patent No.: US 8,949,777 B2
(45) Date of Patent: *Feb. 3, 2015

(54) METHODS AND SYSTEMS FOR MAPPING A FUNCTION POINTER TO THE DEVICE CODE

(75) Inventors: Yang Ni, Sunnyvale, CA (US); Ali-Reza Adl-Tabatabai, San Jose, CA (US); Tatiana Shpeisman, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 957 days.

This patent is subject to a terminal disclaimer.

(21) Appl. No.: 13/092,500

(22) Filed: Apr. 22, 2011

(65) Prior Publication Data

US 2012/0272210 A1 Oct. 25, 2012

(51) Int. Cl.
*G06F 9/44* (2006.01)
*G06F 9/45* (2006.01)

(52) U.S. Cl.
CPC ........................................ *G06F 8/52* (2013.01)
USPC ............................ 717/106; 717/136; 717/140

(58) Field of Classification Search
None
See application file for complete search history.

(56) References Cited

U.S. PATENT DOCUMENTS

| | | | |
|---|---|---|---|
| 6,738,967 B1 * | 5/2004 | Radigan | 717/146 |
| 7,069,421 B1 * | 6/2006 | Yates et al. | 712/209 |
| 7,263,689 B1 * | 8/2007 | Edwards et al. | 717/127 |
| 8,127,121 B2 * | 2/2012 | Yates et al. | 712/244 |
| 8,209,664 B2 * | 6/2012 | Yu et al. | 717/119 |
| 2003/0088860 A1 * | 5/2003 | Wang | 717/153 |
| 2004/0083462 A1 | 4/2004 | Gschwind et al. | |
| 2004/0111715 A1 * | 6/2004 | Stone | 717/148 |
| 2004/0187094 A1 * | 9/2004 | Gil et al. | 717/116 |
| 2008/0114937 A1 * | 5/2008 | Reid et al. | 711/117 |
| 2008/0127146 A1 * | 5/2008 | Liao et al. | 717/150 |
| 2008/0147955 A1 * | 6/2008 | Lagergren et al. | 711/6 |
| 2008/0215768 A1 * | 9/2008 | Reid et al. | 710/22 |
| 2008/0256330 A1 | 10/2008 | Wang et al. | |
| 2008/0270990 A1 * | 10/2008 | Kornstaedt | 717/126 |
| 2010/0122264 A1 | 5/2010 | Xiaocheng et al. | |
| 2011/0022817 A1 | 1/2011 | Gaster et al. | |
| 2012/0144167 A1 * | 6/2012 | Yates et al. | 712/216 |
| 2013/0061240 A1 * | 3/2013 | Yan et al. | 719/312 |
| 2013/0173894 A1 * | 7/2013 | Yan et al. | 712/228 |

OTHER PUBLICATIONS

"PCT Search Report and Written Opinion", PCT/US2012/031855, 9 pages.

* cited by examiner

*Primary Examiner* — Insun Kang
(74) *Attorney, Agent, or Firm* — Blakely, Sokoloff, Taylor & Zafman LLP

(57) ABSTRACT

Methods for mapping a function pointer to the device code are presented. In one embodiment, a method includes identifying a function which is executable by processing devices. The method includes generating codes including a first code corresponds to a first processing device and a second code corresponds to a second processing device. The second processing device is architecturally different from the first processing device. The method further includes storing the second code in a byte string such that the second code is retrievable if the function will be executed by the second processing device.

10 Claims, 4 Drawing Sheets

METHODS AND SYSTEMS FOR MAPPING A FUNCTION POINTER TO THE DEVICE CODE

FIELD OF THE INVENTION

Embodiments of the invention relate to the field of code compilation, in particular, to compiling for execution on heterogeneous devices.

BACKGROUND OF THE INVENTION

Modern computer systems can have a wide range and a variety of configurations. One important component of a computer system is the processor, also referred to as the central processing unit (CPU). The processor executes instructions from a software program, a process referred to as "running" the program. Although typically all processors perform this basic task, a wide variety of different processing devices (e.g., graphics processors) are available from a number of different manufacturers. These different processing devices, especially those from different manufacturers, have different internal designs, also referred to as the processor "architecture", and thus operate in different ways. Although the results from running a program on two different processing devices should be the same, the way in which the processing devices obtain the result, as well as its speed, typically differ.

The development of applications to be executed on heterogeneous processing devices remains a challenging task. Compilers may present a programming model with an executable format (e.g., fat binary) which however requires specific changes to the linker/loader to generate the code.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
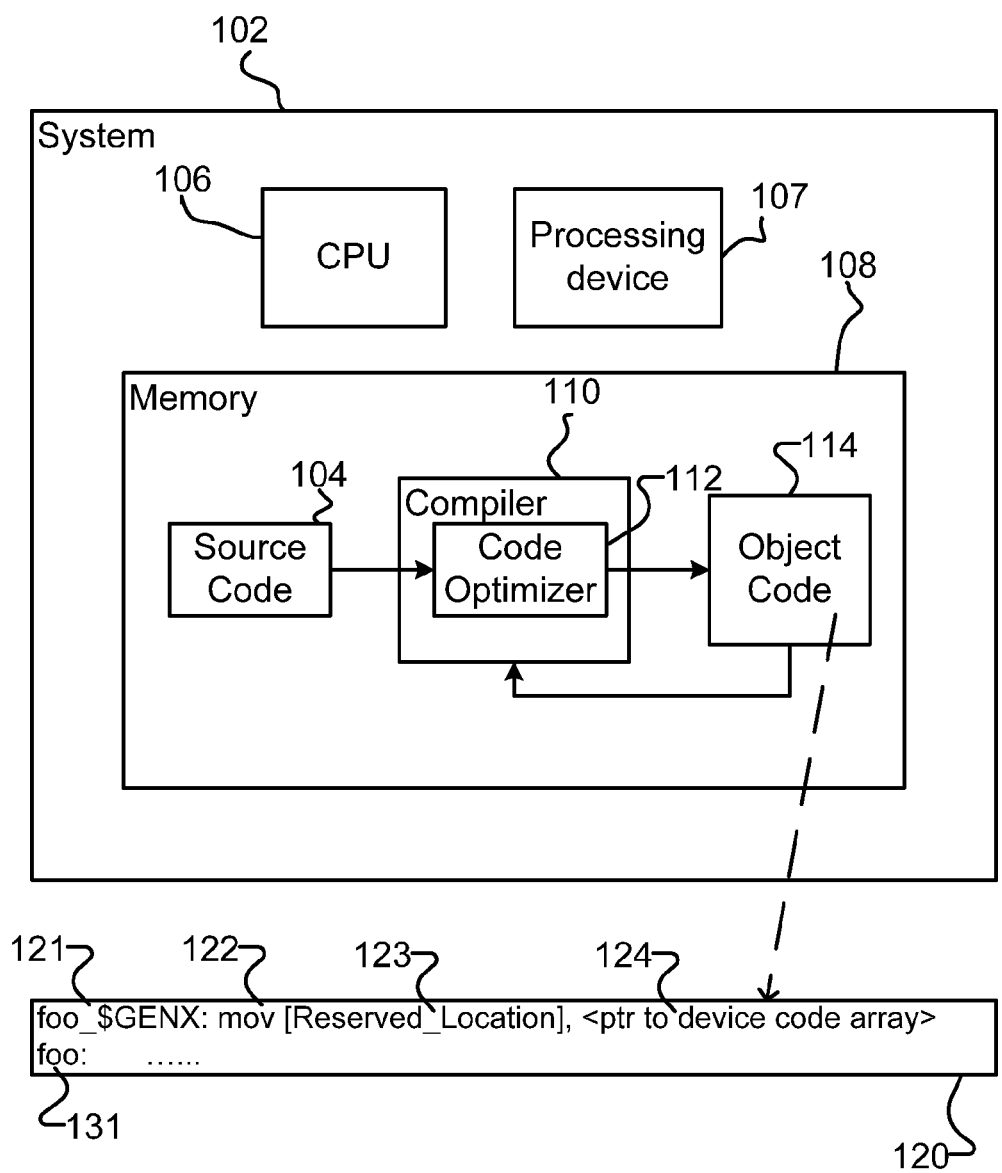
FIG. 1 is a computing system in accordance with one embodiment of the present invention.

Methods for mapping a function pointer to the device code are presented. In one embodiment, a method includes identifying an annotated function which is executable by processing devices. The method includes generating codes including a first code corresponds to a first processing device and a second code corresponds to a second processing device. The second processing device is architecturally different from the first processing device. The method further includes storing the second code in a byte string such that the second code is retrievable if the annotated function will be executed by the second processing device.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The method and apparatus described herein are for mapping a function pointer to a device code. The method and apparatus are primarily discussed in reference to multi-core processor computer systems. However, the method and apparatus for mapping function pointers are not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads.

Overview

Methods for mapping a function pointer to the device code are presented. In one embodiment, a method includes identifying an annotated function which is executable by processing devices. The method includes generating codes including a first code corresponds to a first processing device and a second code corresponds to a second processing device. The second processing device is architecturally different from the first processing device. The method further includes storing the second code in a byte string such that the second code is retrievable if the annotated function will be executed by the second processing device.

FIG. 1 is a computing system in accordance with one embodiment of the present invention. Many related components such as buses and peripherals have not been shown to avoid obscuring the invention. Referring to FIG. 1, computer system 102 comprises central processing unit (CPU) 106, processing device 107, memory 108, source code 104, compiler 110, code optimizer 112, and object code 114.

In one embodiment, processing device 107 is integrated with CPU 106 in a chip. In other embodiments, processing device 107 and CPU 106 are discrete devices. In one embodiment, processing device 107 is also a processing device operable to support some processing workload from CPU 106. In one embodiment, processing device 107 includes processing devices (e.g., a processor, a graphics processor, digital signal processing units, and a microcontroller).

In one embodiment, processing device 107 is an optional device. CPU 106 compiles a program to be executed by another computer system having two or more heterogeneous processing devices. In one embodiment, processing device 107 is architecturally different from CPU 106. Hence, the code for execution on processing device 107 is different from the code for execution on CPU 106.

In one embodiment, computer system 102 is used by a programmer or software developer to create source code 104. In one embodiments, source code 104 comprises program statements in a high level computer language, including object oriented and other languages, e.g., FORTRAN, Java, C++, etc. Computer system 102 includes one or more processors 106 and memory 108 in which programs are loaded and executed by CPU 106. Memory 108 includes compiler 110 to translate source code 104 into executable object code 114. Compiler 110 includes code optimizer 112 executed by CPU 106.

In one embodiment, compiler 110 performs code generation for functions annotated for execution on multiple target devices. Compiler 110 enables mapping a CPU-side function pointer to the code generated for another processing device other than the CPU (e.g., processing device 107). A CPU-side function pointer is a function pointer used in the regular code when execution is only based on CPU 106. In one embodiment, the mapping of the function pointer enables programming models that provide an application programming interface (API) to take a CPU-side function pointer and execute the function on another non-CPU device.

In one embodiment, compiler 110 detects/identifies a function which is annotated for possible execution on one or more processing devices (e.g., a GPU). For example, an annotated function is therefore executable on CPU 106 or one or more processing devices depending on the scheduling and load balancing factors.

In one embodiment, the code generated for the CPU execution is referred to herein as a CPU binary, a CPU executable, or a CPU code. In one embodiment, the code generated for other processing devices is referred to herein as a device binary or a device code. For example, the code generated for a GPU is referred to herein as a GPU binary or a GPU code.

In one embodiment, for each annotated function, compiler 110 generates a device code and stores the device code as a byte string in an array. Compiler 110 adds the array during compilation. The array is not visible to users. In one embodiment, the array is defined as follows: "static char deviceCode <module_suffix>", where module_suffix is a module (compilation unit) specific suffix generated by compiler 110.

In one embodiment, codes for all annotated functions of a module are stored in an array. The codes are delimited by a special byte sequence. Compiler 110 generates the code (CPU binary) for CPU execution as usual. In addition to that, for each annotated function, compiler 110 generates a prologue (also referred herein as a prolog). For example, for an annotated function "foo", the generated code is shown in Table 1 below.

TABLE 1

Code Example foo__$GENx: mov [Reserved-Location], <pointer to the device code array>
foo: .....

In one embodiment, the label foo (i.e., foo 131 in FIG. 1) indicates the beginning of a regular CPU code generated for the function "foo". The foo_$GENX (see 121 in FIG. 1) indicates that the prologue generated for the function "foo" because the function has been annotated for execution on heterogeneous processing devices.

In one embodiment, for example, the first part of the prologue is a "move" instruction (see 122 in FIG. 1). The second operand is a pointer (see 124 in FIG. 1) to the beginning of the device code (e.g., GPU code) for the function "foo" in the device code array.

In one embodiment, the first operand of the prologue (see 123 in FIG. 1), which is also referred to as "the destination", is a reserved memory location. For example, during runtime, CPU 106 receives a function pointer to be passed for execution on other devices, CPU 106 decrements the function pointer by an offset. In one embodiment, the offset is equal to the length of the prologue.

In one embodiment, CPU 106 detects/checks for the unique code pattern in the prologue. As the reserved location is not accessible by users (not visible to users), the "move instruction" in the prologue is unique. For example, if CPU 106 finds this unique code pattern during runtime, CPU 106 extracts the second operand and uses the second operand as a pointer to retrieve the device code of the function from the device code array.

In one embodiment, after retrieving the device code for a function, the device code is sent to a device driver for execution on processing device 107 (e.g., a GPU).

In one embodiment, compiler 106 is used in conjunction with a C-based heterogeneous CPU-GPU programming extension to an asynchronous user-level task-scheduling library (e.g., Intel Thread Building Blocks (TBB)). In another embodiment, compiler 106 is used in conjunction with OpenMP extensions or other parallel programming models for offloading the computation to another processing device.

In one embodiment, for example, the heterogeneous programming model provides a function: "offload(func, env, num_iterations)" which enables the function ("func") to execute on a processing device (e.g., GPU) but does not guarantee that the function will be executed on the processing device. During runtime, a computing system dynamically decides whether to execute the function on the processing device or CPU 106. In one embodiment, for example, a computing system determines whether to execute on a GPU based on the GPU's load, whether the function is suitable to be executed on the GPU, or both.

In one embodiment, compiler 106 generates codes which support the mapping of a function pointer to the corresponding device code efficiently. In one embodiment, a generated device code is stored in the regular data section. A device driver is able to parse and to execute the generated device code. No change is required to the linker/loader to enable the execution on non-CPU processing devices.

The method and apparatus above is primarily discussed in reference to a GPU. However, the methods and apparatus are not so limited, as they may be implemented on or in association with any processing devices including a graphics processor, digital signal processing units, a microcontroller, or any combinations thereof.

In one embodiment, computer system 102 comprises a computer workstation, laptop, desktop, server, mainframe or any other computing device suitable for developing code 104. In one embodiment, CPU 106 comprises one or more central processing units. Memory 108 comprises one or more memory devices into which programs are loaded.

Figure 2A:
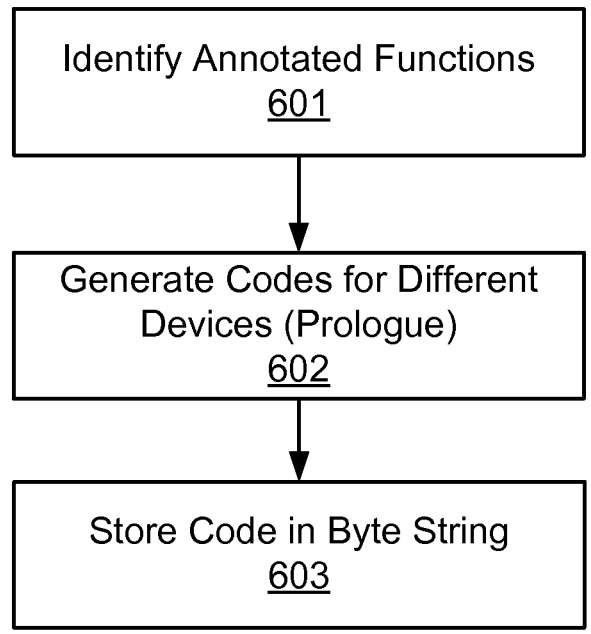
FIG. 2A is a flow diagram of one embodiment of a process to perform program compilation and to map a function pointer to the device code.

FIG. 2A is a flow diagram of one embodiment of a process to perform program compilation and to map a function pointer to the device code. The process is performed by processing logic that may comprise hardware (circuitry, dedicated logic, etc.), software (such as one that is run on a general purpose computer system or a dedicated machine), or a combination of both. In one embodiment, the process is performed in conjunction with a compiler (e.g., compiler 110 with respect to FIG. 1). In one embodiment, the process is performed by a computer system with respect to FIG. 4.

Referring to FIG. 2A, in one embodiment, processing logic begins by identifying an annotated function (process block 601). The annotated function may be executed on a CPU or another non-CPU device (e.g., GPU). In one embodiment, processing logic identifies an annotated function which is executable by two or more processing devices. The annotated function is executable by heterogeneous devices without modifications to a linker and a loader. Processing logic generates a prologue which is used to map a function pointer to the device code during runtime.

In one embodiment, processing logic generates two or more codes for different processing devices (process block 602). Processing logic generates a plurality of codes including a CPU code and a non-CPU device code. The device code is used for execution on another processing device architecturally different from the CPU.

In one embodiment, processing logic generates a prologue which includes a first operand which is a unique pattern to indicate the presence of the second operand in the prologue. In one embodiment, the second operand is a pointer to a byte string which is stored in a device code array. The byte string will be retrieved during runtime and sent to the processing device for execution on the processing device. In one embodiment, the device code is generated without a user intervention.

In one embodiment, processing logic stores the device code in a byte string as described above (process block 603). For example, the byte string is stored in an array which includes other byte strings delimited by a unique byte sequence.

In one embodiment, a number of device codes are generated during compile time. The annotated function is not associated to a specific target device during the compile time. The processing device for the execution of the annotated function is determined during runtime.

Figure 2B:
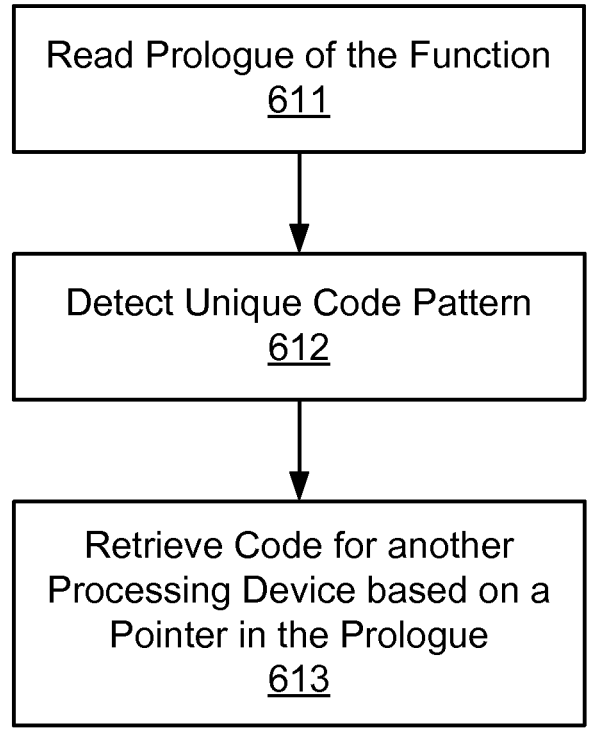
FIG. 2B is a flow diagram of one embodiment of a process to execute a function executable on heterogeneous processing devices.

FIG. 2B is a flow diagram of one embodiment of a process to execute a function executable on heterogeneous processing devices. The process is performed by processing logic that may comprise hardware (circuitry, dedicated logic, etc.), software (such as one that is run on a general purpose computer system or a dedicated machine), or a combination of both. In one embodiment, the process is performed in conjunction with a computer (e.g., computer system with respect to FIG. 1). In one embodiment, the process is performed by a computer system with respect to FIG. 4.

Referring to FIG. 2B, in one embodiment, processing logic begins by receiving a function pointer associated with a function executable on two or more heterogeneous processing devices.

In one embodiment, processing logic decrements a function pointer value by an offset. For example, the offset is equal to the length of the prologue. Processing logic retrieves a prologue of the function based on the decremented function pointer value (process block 611).

In one embodiment, processing logic detects a unique code patent (process block 612). Processing logic reads the prologue and identifies the unique code pattern in the prologue. Processing logic retrieves the device code from an array based on the second operand of the prologue. The second operand of the prologue is a pointer to the device code stored in an array.

In one embodiment, processing logic retrieves a device code for the processing device based on a pointer in the prologue (process block 613). Processing logic sends the device code to the corresponding processing device driver. The function is therefore executed on the processing device by using the device code.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 3:
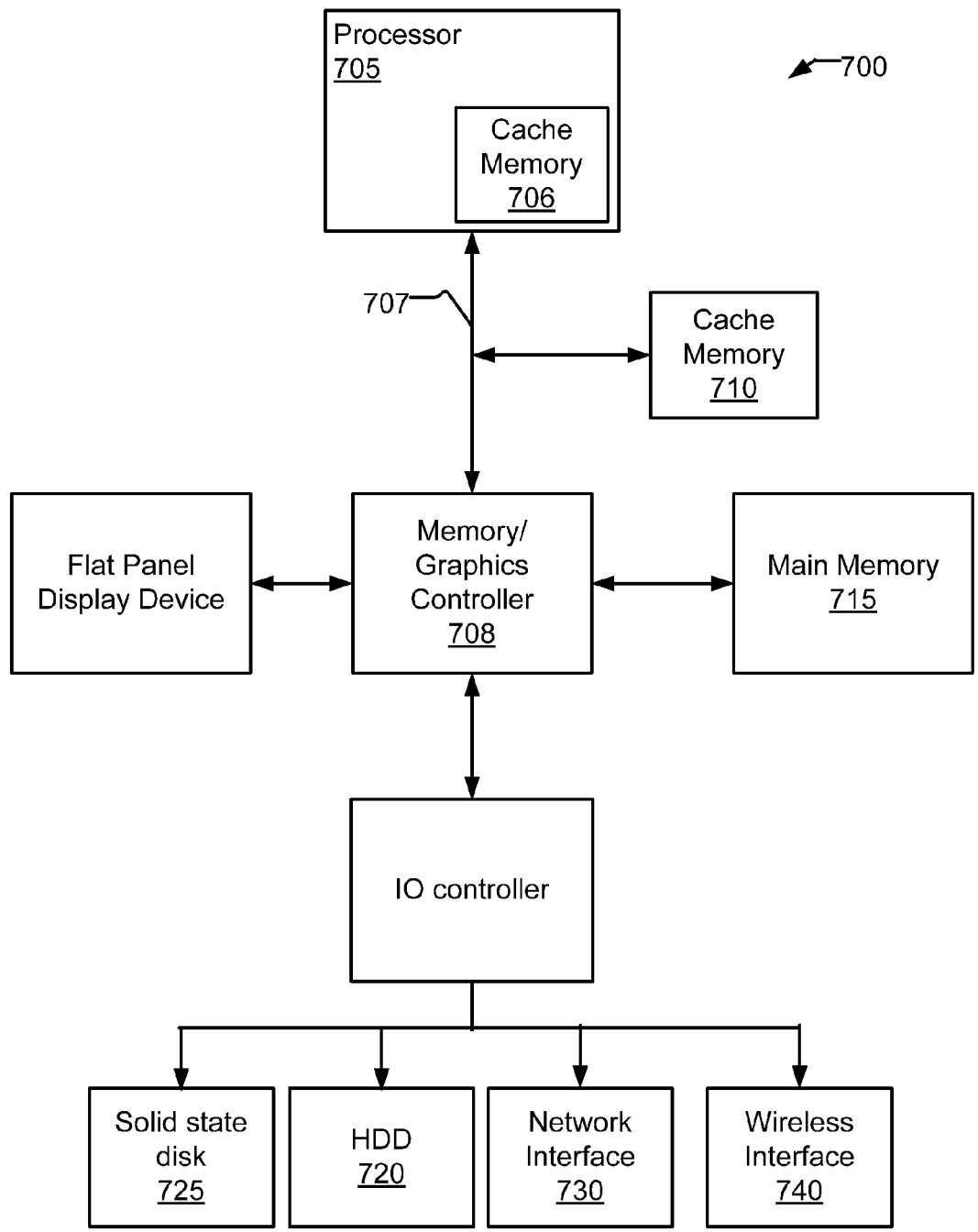
FIG. 3 illustrates a computer system for use with one embodiment of the present invention.

FIG. 3, for example, illustrates a computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

Processor 705 may have any number of processing cores. Other embodiments of the invention, however, may be implemented within other devices within the system or distributed throughout the system in hardware, software, or some combination thereof.

In one embodiment, graphics controller 708 is integrated with processor 705 in a chip. In other embodiment, graphics controller 708 and processor 705 are discrete devices. In one embodiment, graphic controller 708 is also a processing device operable to support some processing workload from processor 705. In one embodiment, graphics controller 708 includes a processing device (e.g., a processor, a graphics processor, digital signal processing units, and a microcontroller).

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 3. Furthermore, other embodiments of the invention may be distributed throughout several circuits, logic units, or devices illustrated in FIG. 3.

Figure 4:
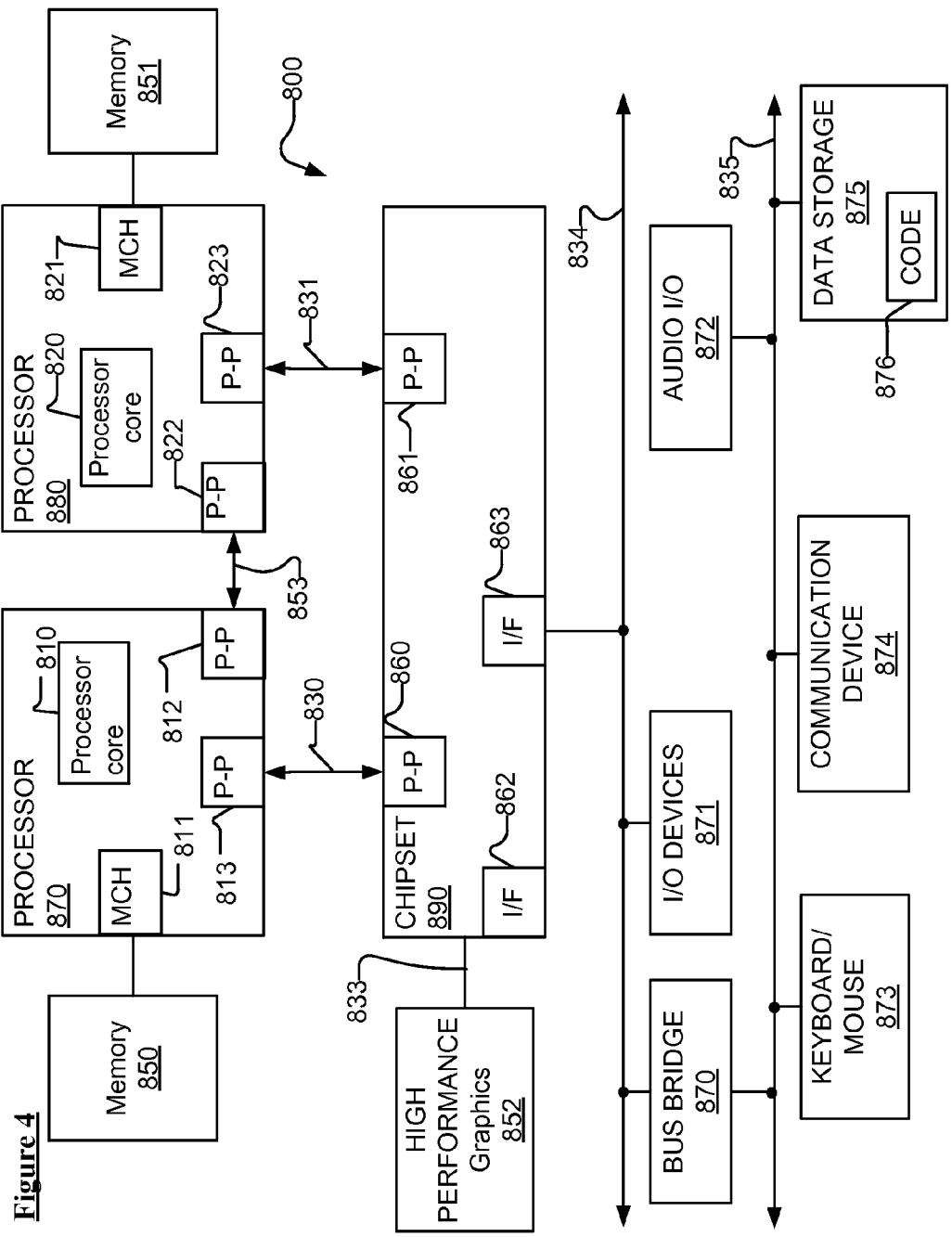
FIG. 4 illustrates a point-to-point computer system for use with one embodiment of the invention.

Similarly, at least one embodiment may be implemented within a point-to-point computer system. FIG. 4, for example, illustrates a computer system that is arranged in a point-to-point (PtP) configuration. In particular, FIG. 4 shows a system where processors, memory, and input/output devices are interconnected by a number of point-to-point interfaces.

The system of FIG. 4 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or within data storage 875, or within memory 850 of FIG. 4.

Other embodiments of the invention, however, may exist in other circuits, logic units, or devices within the system of FIG. 4. Furthermore, other embodiments of the invention may be distributed throughout several circuits, logic units, or devices illustrated in FIG. 4.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method comprising:
    identifying a first function which is executable by two or more processing devices;
    generating a first code corresponding to the first function, at a first processing device, for execution at the first processing device;
    generating a second code corresponding to the first function, at the first processing device;
    generating a prologue, at the first processing device, including an instruction having a first operand that is a unique code pattern providing a reserved memory destination location and a pointer to a beginning of code in a byte string for the first function to be executed at a second processing device architecturally different from the first processing device; wherein the generating of the second code comprises the generating of the prologue and the unique code pattern indicates the presence of the pointer; and
    storing the second code in the byte string such that the second code is retrievable if the first function will be executed by the second processing device.

2. The method of claim 1, wherein the first processing device is a central processing unit (CPU) and the second device is a non-CPU processing device.

3. The method of claim 1, wherein the byte string is stored in an array which includes other byte strings delimited by a unique byte sequence.

4. The method of claim 1, wherein the first function is executable by heterogeneous devices without modifications to a linker and a loader.

5. The method of claim 1, wherein the second code is generated without a intervention.

6. The method of claim 1, wherein the first plurality of codes are generated during compile time during which the first function is not associated to a specific target device, wherein the processing device for the execution of the first function is determined during runtime.

7. An article of manufacture comprising a non-transitory computer readable storage medium including data storing instructions thereon that, when accessed by a machine, cause the machine to perform a method comprising:
    identifying a first function which is executable by two or more processing devices;
    generating a first code corresponding to the first function, at a first processing device, for execution at the first processing device;
    generating a second code corresponding to the first function, at the first processing device;
    generating a prologue, at the first processing device, including an instruction having a first operand that is a unique code pattern providing a reserved memory destination location and a pointer to a beginning of code in a byte string for the first function to be executed at a second processing device architecturally different from the first processing device; wherein the generating of the second code comprises the generating of the prologue and the unique code pattern indicates the presence of the pointer; and storing the second code in the byte string such that the second code is retrievable if the first function will be executed by the second processing device.

8. A system to execute programs, comprising:

a first processing device to generate a first function;

a second processing device; and memory to store a program including the first function executable by the first processing device and the second processing device during runtime, wherein the first function is associated with a prologue which includes an instruction having a first operand that is a unique code pattern providing a reserved memory destination location and a pointer to a beginning of code in a byte string for the first function to be executed at the second processing device architecturally different from the first processing device, and wherein the unique code pattern indicates the presence of the pointer.

9. The system of claim 8, wherein the first processing device and the second processing device are architecturally different, wherein different codes will be used to execute the first function on different processing devices during runtime.

10. The system of claim 8, wherein the system is operable to decrement a function pointer value by the length of the prologue, read the prologue and identify the unique code pattern in the prologue; and retrieve the code based on the second operand of the prologue.

* * * * *